United States Patent
Kammerlander et al.

(10) Patent No.: US 9,323,665 B2
(45) Date of Patent: Apr. 26, 2016

(54) CIRCUIT FOR GENERATING A START SEQUENCE AND METHOD FOR GENERATING A START SEQUENCE

(75) Inventors: Peter Kammerlander, Graz (AT); Thomas Jessenig, Graz (AT); Christian Halper, Olbendorf (AT)

(73) Assignee: ams AG, Unterpremstaetten (AU)

( * ) Notice: Subject to any disclaimer, the term of this patent is extended or adjusted under 35 U.S.C. 154(b) by 181 days.

(21) Appl. No.: 13/984,276

(22) PCT Filed: Jan. 24, 2012

(86) PCT No.: PCT/EP2012/051037
§ 371 (c)(1),
(2), (4) Date: Oct. 22, 2013

(87) PCT Pub. No.: WO2012/107271
PCT Pub. Date: Aug. 16, 2012

(65) Prior Publication Data
US 2014/0310446 A1    Oct. 16, 2014

(30) Foreign Application Priority Data
Feb. 8, 2011    (DE) .......................... 10 2011 010 610

(51) Int. Cl.
| | | |
|---|---|---|
| *G06F 3/00* | (2006.01) | |
| *G06F 9/00* | (2006.01) | |
| *G06F 9/24* | (2006.01) | |
| *G06F 15/177* | (2006.01) | |
| *G06F 12/02* | (2006.01) | |
| *G06F 1/24* | (2006.01) | |

(52) U.S. Cl.
CPC .............. *G06F 12/0246* (2013.01); *G06F 1/24* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 5,650,939 A | | 7/1997 | Yoshida |
| 5,832,286 A | * | 11/1998 | Yoshida .................... G06F 1/26 307/31 |
| 7,383,452 B2 | * | 6/2008 | Veselic .......................... 713/300 |
| 2007/0101166 A1 | * | 5/2007 | Boyum et al. ................. 713/300 |
| 2009/0319871 A1 | | 12/2009 | Shirai et al. |
| 2010/0042773 A1 | | 2/2010 | Yeh |
| 2011/0022859 A1 | * | 1/2011 | More et al. ..................... 713/300 |
| 2013/0198427 A1 | * | 8/2013 | Leitner ............... G06F 13/4291 710/110 |

FOREIGN PATENT DOCUMENTS

| | | |
|---|---|---|
| EP | 2151738 A1 | 2/2010 |
| GB | 2472051 A | 1/2011 |

* cited by examiner

*Primary Examiner* — Michael Sun
(74) *Attorney, Agent, or Firm* — McDermott Will & Emery LLP

(57) ABSTRACT

The invention relates to a circuit and to a method for generating a start sequence. The circuit comprises at least one partially programmable memory (nonvol) for storing an encoded start sequence (Ni) and a control unit (CTRL), which is equipped to read the encoded start sequence (Ni) and decode it into a decoded start sequence (dNi) and to generate a target register address (n) depending on the decoded start sequence (dNi). An addressable memory (vol) is provided, to which the decoded start sequence (dNi) can be written by means of the control unit (CTRL) at the target register address (n).

16 Claims, 3 Drawing Sheets

Figure 1:
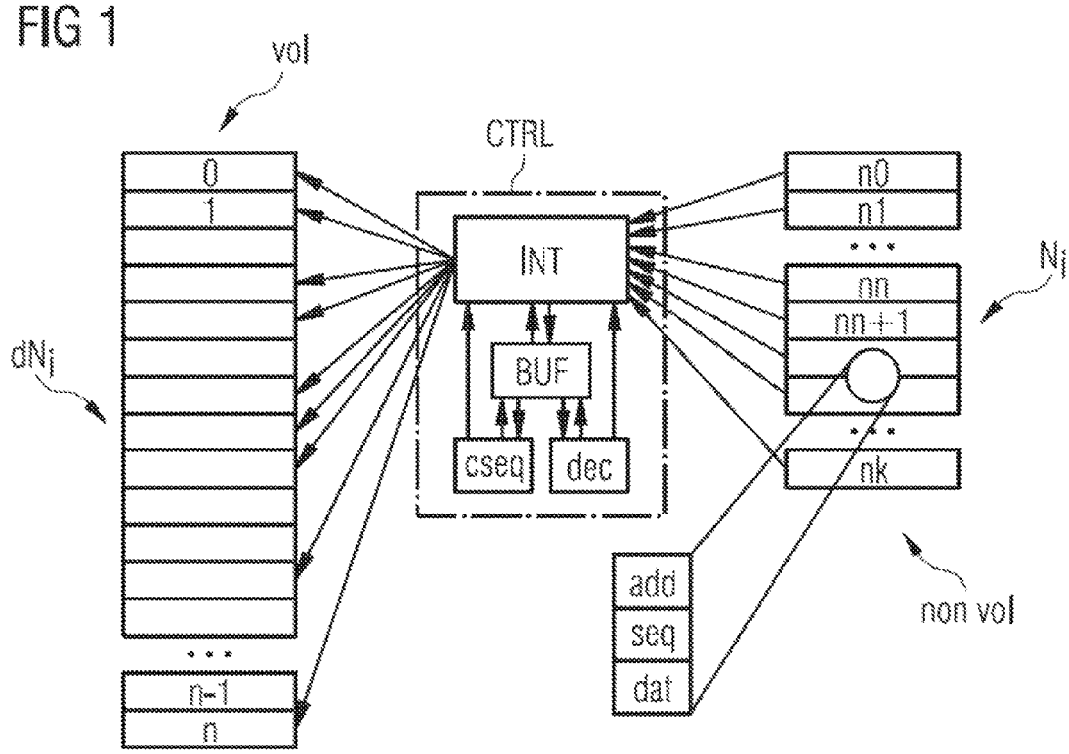

CIRCUIT FOR GENERATING A START SEQUENCE AND METHOD FOR GENERATING A START SEQUENCE

The present invention concerns a circuit for generating a start sequence and a method for generating a start sequence.

Modern processors and integrated applications comprise a number of components such as processor cores, memories, interfaces and registers. These components are mainly supplied with electricity via a complex network of power lines and power supplies. Precisely when such systems are being powered on, it is absolutely necessary to connect power lines in defined starting sequences and provide specific voltages. The management tasks necessary for this are taken on by a power management unit (PMU). These special components have registers, with the aid of which starting sequences and voltage values can be controlled during power-on and operation.

One possibility for defining start sequences is to store a sequence in a space-saving permanent memory or "read-only memory" (ROM). By means of suitable microcontrollers and interfaces, the start sequence can be quickly read from this memory and made available for use. Such a solution is inflexible, however, and must be laboriously adapted whenever components such as the processor are exchanged. An alternative possibility is to provide an arbitrarily programmable random access memory (RAM), on which a user can program a sequence at the factory or in connection with hardware modifications. Such memories have a disadvantage, however, because they have a large space requirement and thus require high production costs. A further possibility is to program alternative start sequences and provide them on a common memory. A sequence can be chosen on the basis of the connected components. This solution has obvious disadvantages; it is inflexible and tied to only a few scenarios.

The problem of the present invention is therefore to propose a circuit for generating a start sequence and a method for generating a start sequence that allows greater flexibility and a simple and inexpensive implementation.

The problem is solved with the subject matter of the independent claims. Refinements and configurations are the subject matter of the dependent claims.

A start sequence is understood below to mean a series of operations that a computing unit such as a processor or an integrated application executes while switching on. The switching on can take place when starting the computing unit or also when use is resumed from a power-saving mode or the like.

In one embodiment, a circuit for generating a start sequence comprises at least one partially programmable memory for storing a coded start sequence. The circuit additionally has a control unit and an addressable memory.

A user stores the coded start sequence in the programmable memory for example. The coding is accomplished by programming in such a manner that a start sequence is defined and can be read out by suitable components. The control unit is provided and set up such that it can read the coded start sequence and subsequently decode it into a decoded start sequence. To do this the control unit generates suitable target register addresses on the basis of the coded start sequence. Then the decoded start sequence is written into the addressable memory by the control unit at the generated target register address or addresses. The addressable memory preferably has a suitable set of registers with register addresses.

After an initialization, the decoded start sequence written into the addressable memory in this manner can then run and thus defines the switching-on process of a computing unit. Operations are preferably called up by means of the decoded start sequence and thus define a running sequence for the start sequence. Possible operations set a defined voltage or control signals, for example.

The circuit presented allows particularly flexible and simple programming of start sequences. In particular, the programmable memory can be constructed to be relatively small. Read-only memories (ROMs), OTPs (so-called one-time programmable memories), digital storage chips or flash memory are preferably used. These types of memory are particularly inexpensive, easily interchangeable and can be easily programmed by a user.

By generating and using target register addresses, it is further possible to utilize a large set of addressable registers of the addressable memory for defining the decoded start sequence. Access to this larger number of registers is then possible during the start sequence. In this manner, not only via the target register addresses can power supplies regulators be activated in an integrated circuit such as a DC/DC converter or a charge pump. General-purpose input output (GPIO) pins can also generally be used. Thereby internal and external control signals and status information can also be integrated into the start sequence at defined points in time and be synchronized. This allows a particularly high degree of flexibility in the programming of start sequences.

In another embodiment, the control unit comprises a microcontroller or a finite-state automaton.

In another embodiment, the programmable memory has at least one programmable register address. This at least one register address, but preferably multiple register addresses, allows the user to code relevant information such as internal and external control signal values and status information for the running of a start sequence. An order for running the coded start sequence can be specified for this purpose by means of the coded start sequence. For example, entries at the register addresses can be read out incrementally from small to large addresses. Other orders are in principle equally possible. Combining certain programmable register addresses with a permanent connection directly to target register addresses and thus specifying a part of the start sequence unchangeably can also be provided.

In another embodiment, the programmable register address has programmable fields.

These programmable fields are used for holding data for the running of the start sequence. In particular, these fields can have a target address, a sequence time marker or a state variable.

The decoded start sequence can subsequently be defined by the circuit with the aid of this information. For this purpose, the user can specify appropriate target addresses at which the contents of the state variables are written at a defined time, characterized perhaps by the sequence time markers. The user has a variety of design options at his disposal in this manner.

According to another embodiment, the control unit comprises an interface, a buffer, a sequence control unit and an address decoder.

The interface is designed to read the coded start sequence stored in the programmable memory and to write the decoded start sequence into the addressable memory at the target register address or addresses. The buffer is used to store the necessary intermediate steps in the decoding of the start sequence. For this purpose, the buffer comprises a memory and is connected by means of a bidirectional data link to the interface.

The sequence control unit is designed to control the buffer and the interface. It is used to read out the coded start sequence and based on the information coded therein, to write a temporal running sequence of the decoded start sequence, preferably on the basis of sequence time markers. For this purpose, the buffer is connected by means of a bidirectional data link, and the interface by means of a unidirectional link, to the sequence control unit.

The address decoder is designed to decode the coded start sequence into the decoded start sequence. For this purpose, the address decoder is capable of causing the decoded start sequence to be written to the target register addresses. The address decoder is also connected to the buffer by means of a bidirectional connection and to the interface by means of a unidirectional connection.

In another embodiment, the sequence control unit controls the buffer and the interface, on the basis of the coded start sequence, in such a manner that a temporal order of the decoded start sequence can be defined.

The decoded start sequence is preferably read out incrementally in accordance with successive target register addresses. The points in time inside the sequence at which defined voltage values or signals are present at defined connections can accordingly be defined.

In another embodiment, the sequence control unit generates time markers to specify the decoded sequence.

The temporal running of the decoded start sequence can be further defined with the aid of the time markers or sequence markers. It is thus possible to synchronize an additional step in the running of the start sequence with a preceding step or the beginning of the sequence. It is also possible to program delays and interrupt the running of the start sequence for a defined period of time, or only to resume by means of a control signal. In principle the time markers can be defined flexibly by the user.

One embodiment of a method for generating a start sequence comprises initially reading out a coded start sequence from a programmable memory. The coded start sequence can have been defined internally or externally in advance by a programmer. This coded start sequence is subsequently decoded into a decoded start sequence. In particular, a target register address is generated on the basis of the coded start sequence. The decoded start sequence is written into an addressable memory at this target register address.

The method presented allows flexible and simple programming of start sequences. In particular the coding of the start sequence can be executed in a space-saving manner in the programmable memory. Read-only memories (ROMs), OTPs (so-called one-time programmable memories), digital storage chips or flash memory are preferably used. These types of memory are particularly inexpensive, easily interchangeable and can be easily programmed by a user.

By generating and using target register addresses, it is further possible to utilize a large set of addressable registers of the addressable memory for defining the decoded start sequence. Access to this larger number of registers is then possible during the start sequence. In this manner, not only via the target register addresses can power supplies regulators be activated in an integrated circuit such as a DC/DC converter or a charge pump. General-purpose input output (GPIO) pins can also generally be used. Thereby internal and external control signals and status information can be integrated into the start sequence at defined points in time and be synchronized. This allows a particularly high degree of flexibility in the programming of start sequences.

In one embodiment, the coded start sequence is defined by programming programmable register addresses.

The programmable register addresses allow the user to code relevant information such as internal and external control signal values and status information for the running of a start sequence. An order for running the coded start sequence can be specified for this purpose by means of the coded start sequence. For example, entries at the register addresses can be read out incrementally from small to large addresses. Other orders are in principle equally possible. Combining certain programmable register addresses with a permanent connection directly to target register addresses and thus specifying a part of the start sequence unchangeably can also be provided.

In another embodiment, the programming is done by defining one or more programming fields.

In particular, each programming field has a target address, a sequence time marker or a state variable. With these field variables, a programmer is able to define the start sequence in a particularly flexible manner. The target address defines the address in the addressable memory and its position in the running order of the start sequence. Time relationships to other sequence steps, such as a synchronization or delay, can be determined with the sequence markers. The state variable can hold status information or voltage values.

In another embodiment, a target register address is defined on the basis of a time marker. This depends in particular on the sequence time marker.

In another embodiment, the time marker can be specified by the subsequent programming steps. One or more interruptions can be provided with a first time marker. These are canceled by means of a control signal, in particular by means of an internal or external control signal. A second time marker can define a delay, which delays the running of the start sequence temporally for a defined time duration. Finally, it can also be possible with a third time marker to define program loops that enable passing through the successive steps inside the start sequence multiple times. The time markers furnish the programmer with extensive possibilities for intervening in the creation of start sequences. In another embodiment, the decoded start sequence is written multiple times into the addressable memory at the target register address.

The invention will be described in detail below for several exemplary embodiments with reference to figures. Insofar as circuit parts or components correspond to one another in function, a description of them will not be repeated in each of the following figures.

Figure 2:
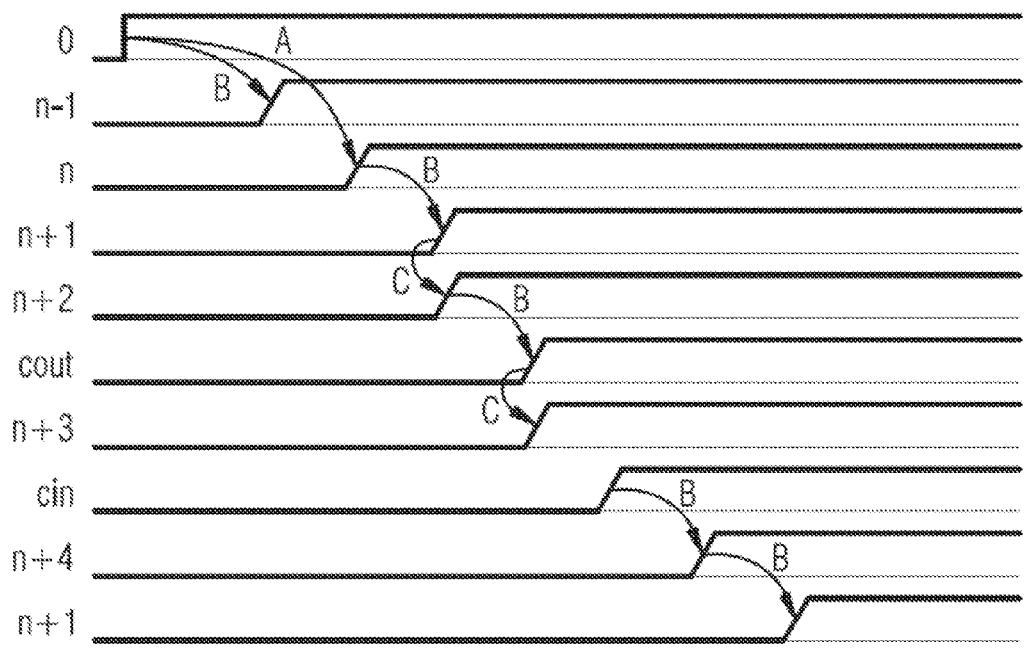
Figure 3:
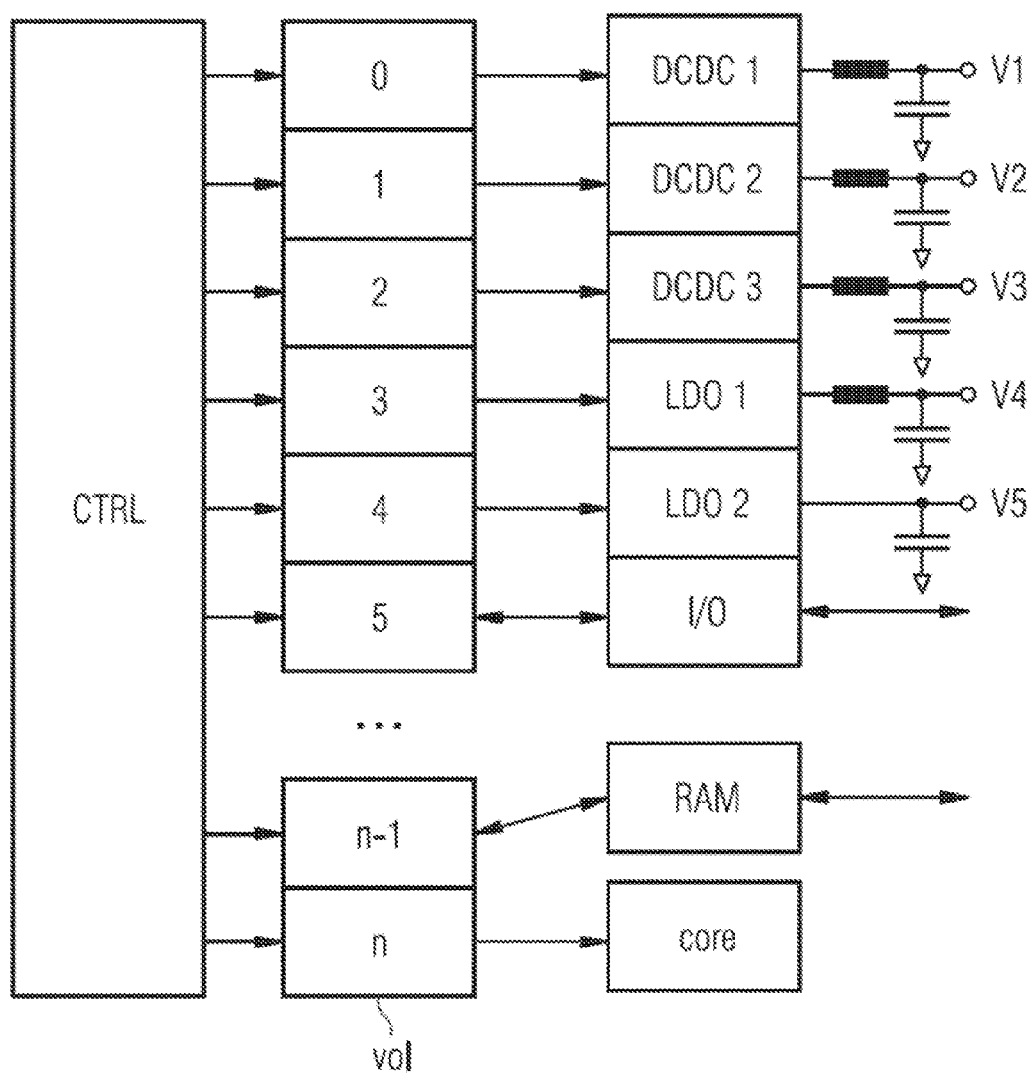

Therein:

FIG. 1 shows an exemplary embodiment of a circuit for generating a start sequence according to the proposed principle, FIG. 2 shows an exemplary decoded start sequence generated according to the proposed principle, and FIG. 3 shows an exemplary arrangement of a circuit for generating a start sequence according to the proposed principle.

FIG. 1 shows an exemplary embodiment of a circuit for generating a start sequence according to the proposed principle. The circuit comprises a programmable memory nonvol with fixed register addresses n0, n1 and programmable register addresses nn, nn+1, ..., nk. Each of these programmable register addresses is further subdivided into programmable fields add, seq, dat. In particular, each programming field has a target address add, a sequence time marker seq or a state variable dat. With these field variables, a programmer is able to define the start sequence in a particularly flexible manner. The target address defines the target register address n in an addressable memory vol and its position in the running of the start sequence. Time relationships with other sequence steps such as synchronization or a delay can be specified with the sequence marker seq. The state variable dat can hold status information or voltage values.

The fixed register addresses n0, n1 can be permanently connected to certain components and thus determine a fixed assignment, which usually also makes sense in different uses of the circuit and can be reused. It is therefore not necessary for the fixed register addresses n0, n1 to have address information. The fixed register addresses are not needed for a start sequence and are used for a chip configuration, for example.

A control unit CTRL comprises an interface INT, a buffer BUF, a sequence control unit CSEQ and an address decoder DEC.

The interface INT is designed to carry out all tasks that must be executed with a read and write access to the programmable memory nonvol and the addressable memory vol. For this purpose, the interface INT is capable of reading a coded start sequence Ni out of the programmable memory nonvol and of writing a decoded start sequence dNi into the addressable memory vol.

The buffer BUF is used for temporary storage of data before they are written into the addressable memory vol. The buffer BUF is also capable of performing data manipulation within a certain scope. For example, if the input information as stored in the programmable memory has a shorter bit length than the data format of the addressable memory vol, the buffer BUF can undertake a conversion.

The address decoder DEC checks target register addresses $0, 1, \ldots, n-1, n$, as stored in the coded start sequence Ni in the programmable memory nonvol. For this purpose, the address decoder decodes on the basis of addresses and constant variables stored in the coded start sequence Ni into the target register addresses $0, 1, \ldots, n-1, n$ of the addressable memory vol.

The sequence controller CSEQ is designed to read information such as addresses and content variables from the coded start sequence Ni and control the data buffer BUF as well as the interface INT. In particular, the sequence controller CSEQ controls the interface INT in such a manner that entries of the decoded start sequence are written into the addressable memory vol at certain times. A target register address can also be written multiple times.

This sequence controller CSEQ generates time markers A, B, C for controlling the interface INT. These time markers will be explained in connection with FIG. 2. FIG. 2 shows an exemplary decoded start sequence according to the proposed principle. The target register addresses n of the decoded sequence dNi as shown are called up in increasing order, i.e. in the order $0, n-1, n, n+1$ in this case. Sequence time markers seq are stored at the corresponding target register addresses n. A type A time marker signifies a reference to the beginning of the start sequence. A type B time marker refers in the temporal sequence to the preceding register n. A type C sequence time marker means no delay and refers to the same time as the present event. In this manner, runs of the start sequence seq can be generated and flexibly adapted within wide ranges by programming the sequence time markers seq. In particular, this makes it possible to incorporate internal and external control signals and also to write a register multiple times (see register n+1 in FIG. 2).

FIG. 3 shows a possible arrangement of a circuit for generating a start sequence according to the proposed principle. The control unit CTRL and the addressable memory vol are shown. Corresponding to the decoded start sequence dNi as generated by the control unit CTRL, processes are executed via the respective data lines and are used for example for providing power to additional components.

Here for example, the target register addresses 0, 1, 2 are linked to respective voltage converters DCDC1, DCDC2, DCDC3. The latter provide voltages V1, V2, V3 of a defined value. The target register addresses 3 and 4 are linked in this case to regulators LDO1, LD02 and deliver corresponding voltages V4 and V5. The register address 5 is linked to an I/O interface and can bidirectionally write or read a control signal CI, COUT. In addition, access to a RAM memory is possible by means of the target register address n−1. The target register n is provided for example for configuration or further communication with a processor core CORE.

LIST OF REFERENCE SYMBOLS

0 Target register address
1 Target register address
2 Target register address
3 Target register address
4 Target register address
5 Target register address
A Time marker
add Address
B Time marker
BUF Buffer
C Time marker
cin Control signal
core Processor core
cout Control signal
cseq Sequence controller
CTRL Control unit
dat State variable
DCDC1 Voltage converter
DCDC2 Voltage converter
DCDC3 Voltage converter
dec Address decoder
dNi Decoded start sequence
INT Interface
LDO1 Regulator
LDO2 Regulator
n0 Programmable register address
n1 Programmable register address
Ni Coded start sequence
n−1 Target register address
n Target register address
n+1 Target register address
n+2 Target register address
n+3 Target register address
n+4 Target register address
nn Programmable register address
nn+1 Programmable register address
nk Programmable register address
nonvol Programmable memory
I/O Input/Output
RAM Memory
seq Sequence time marker
V1 Voltage
V2 Voltage
V3 Voltage
V4 Voltage
V5 Voltage
vol Addressable memory

The invention claimed is:
1. A circuit for generating a start sequence, comprising a series of operations that are performed by a computing unit in a switch-on process, the circuit comprising:
   an at least partially programmable memory for storing a coded sequence;
   a control unit, which is designed to read the coded start sequence and decode it into a decoded start sequence and to generate at least one target register address on the basis of the coded start sequence; and an addressable memory, which has a set of registers with register addresses, and into which the decoded start sequence can be written at the target register address by means of the control unit, one of the register addresses being defined by the target register address, wherein at least one of the register addresses of the addressable memory is linked to a voltage supply circuit of the computing unit, and wherein at least one of the register addresses of the addressable memory is linked to an input/output interface of the computing unit.

2. The circuit according to claim 1, wherein the control unit has a microcontroller or a finite-state automaton.

3. The circuit according to claim 1 or 2, wherein the programmable memory has at least one programmable register address.

4. The circuit according to claim 3, wherein the programmable register address has programmable fields, in particular for storing a target address, a sequence time marker or a state variable.

5. The circuit according to claim 1, wherein the control unit comprises an interface, a buffer, a sequence control unit and a decoder, wherein the interface is designed to read the coded start sequence stored in the programmable memory and to write the decoded start sequence into the addressable memory at the target register address, wherein the buffer has a memory and is connected by means of a bidirectional data link to the interface, wherein the sequence control unit is designed to control the buffer and the interface, the buffer being connected to the sequence control unit by means of a bidirectional data link and the interface being connected thereto by means of a unidirectional data link, and wherein the address decoder is designed to decode the coded start sequence into the decoded start sequence, the buffer being connected by means of a bidirectional data link to the address decoder and the interface being connected thereto by means of a unidirectional data link.

6. The circuit according to claim 5, wherein, based on the coded start sequence, the sequence control unit controls the buffer and the interface in such a manner that a temporal succession of the decoded start sequence can be defined.

7. The circuit according to claim 6, wherein the sequence control unit generates time markers for defining a temporal succession of the coded sequence.

8. The circuit according to claim 1, wherein the control unit is configured to generate the target register address on the basis of a time marker that is comprised by the decoded start sequence.

9. The circuit according to claim 8, wherein the control unit is configured to make a definition depending on the time marker selected from the following:

definition of one or more interruptions, which can be canceled by means of a control signal, in particular by means of an internal or external control signal, definition of one or more delays, or definition of one or more loops.

10. A method for generating a start sequence, comprising a series of operations that are performed by a computing unit in a switch-on process, the method comprising:

reading out a coded start sequence from a programmable memory;

decoding the coded start sequence into a decoded start sequence;

generating at least one target register address on the basis of the coded start sequence; and writing the decoded start sequence into an addressable memory, which has a set of registers with register addresses, at the target register address, one of the register addresses being defined by the target register address, wherein at least one of the register addresses of the addressable memory is linked to a voltage supply circuit of the computing unit, and wherein at least one of the register addresses of the addressable memory is linked to an input/output interface of the computing unit.

11. The method according to claim 10, wherein the coded start sequence is defined by means of at least one programmable register address.

12. The method according to claim 11, wherein the programming comprises defining a programming field that has a target address, a sequence marker or a state variable.

13. The method according to claim 10, wherein the target register address is generated on the basis of a time marker.

14. The method according to claim 13, wherein, depending on the time marker in the decoded start sequence, definitions are made selected from the following:

one or more interruptions are defined, which can be canceled by means of a control signal, in particular by means of an internal or external control signal, one or more delays are defined, or one or more loops are defined.

15. The method according to claim 10, wherein the decoded start sequence is written multiple times into the addressable memory at the target register address.

16. The method according to claim 13, wherein the time marker is comprised by the decoded start sequence.

* * * * *